United States Patent [19]

Brindöpke et al.

[11] Patent Number: 5,126,424

[45] Date of Patent: Jun. 30, 1992

[54] CURING COMPONENT FOR SYNTHETIC RESINS, CURABLE MIXTURES CONTAINING SAME, AND THE USE THEREOF

[75] Inventors: Gerhard Brindöpke, Frankfurt am Main; Helmut Plum, Taunusstein, both of Fed. Rep. of Germany

[73] Assignee: Hoechst AG, Fed. Rep. of Germany

[21] Appl. No.: 470,925

[22] Filed: Jan. 26, 1990

Related U.S. Application Data

[63] Continuation of Ser. No. 257,385, Oct. 13, 1988, abandoned.

[30] Foreign Application Priority Data

Oct. 15, 1987 [DE] Fed. Rep. of Germany ....... 3734916

[51] Int. Cl.$^5$ .................. C08G 18/34; C08G 18/50; C08G 18/80; C09D 175/00
[52] U.S. Cl. ......................... 528/45; 528/48; 528/52; 528/60; 528/61; 528/68; 528/76; 560/158
[58] Field of Search ................. 528/68, 76, 48, 45, 528/52, 60, 61; 560/158

[56] References Cited

U.S. PATENT DOCUMENTS

| | | | |
|---|---|---|---|
| 3,654,370 | 4/1972 | Yeakey | 564/480 |
| 4,101,530 | 7/1978 | Burkhardt et al. | 528/45 |
| 4,518,522 | 5/1985 | Markusch et al. | 252/188.31 |
| 4,523,025 | 6/1985 | Cuscurida et al. | 560/26 |
| 4,734,520 | 3/1988 | Plum et al. | 560/115 |
| 4,761,465 | 8/1988 | Speranza et al. | 528/45 |
| 4,767,836 | 8/1988 | Cuscurida et al. | 528/45 |
| 4,859,788 | 8/1989 | Brindöpke et al. | 528/119 |
| 4,975,514 | 12/1990 | Watanabe et al. | 528/60 |
| 5,010,160 | 4/1991 | Speranza et al. | 528/61 |
| 5,039,720 | 8/1991 | Saatweber et al. | 528/45 |

FOREIGN PATENT DOCUMENTS

| | | |
|---|---|---|
| 381500 | 5/1985 | Austria. |
| 2550156 | 11/1975 | Fed. Rep. of Germany. |
| 2038811 | 7/1980 | United Kingdom. |

*Primary Examiner*—John Kight, III
*Assistant Examiner*—Rabon Sergent
*Attorney, Agent, or Firm*—Bierman and Muserlian

[57] ABSTRACT

Products of the reaction of (a) a polyisocyanate, (b) a CH-active alkyl ester, (c) a polyoxyalkyleneamine and (d) if appropriate a further NH- and/or OH-reactive compound as the curing component for binders (B) which contain groups which are capable of amide and-/or ester formation.

Mixtures of (A) and (B), and where appropriate diluents (C) and additives (D), have a long shelf life, even in aqueous systems, and are particularly suitable for aqueous paint formulations.

14 Claims, No Drawings

CURING COMPONENT FOR SYNTHETIC RESINS, CURABLE MIXTURES CONTAINING SAME, AND THE USE THEREOF

PRIOR APPLICATION

This application is a continuation of U.S. Pat. application Ser. No. 257,385 filed Oct. 13, 1988, now abandoned.

It is known (Petersen, Taube; Liebigs Ann. Chem. 562, (1949) 205) that compounds containing a methanetricarboxylic acid dialkyl ester monoamide structural unit, which reacts from as low as about 130° C. with polyol resins with crosslinking and elimination of alkanol, can be prepared from isocyanates and dialkyl malonates in the presence of sodium or sodium alkoxides as catalysts.

This reaction has consequently been used in many cases for the preparation of curing components for liquid baking paints or baking paints containing organic solvents.

Thus, German Offenlegungsschrift 2,342,603 describes a process for the preparation of biuret polyisocyanates which are blocked by dialkyl malonates. In this process, a monomer-free biuret polyisocyanate is initially prepared in a relatively inconvenient two-step reaction (preparation of a mixture of biuret polyisocyanate and monomeric diisocyanate and subsequent removal of the monomeric diisocyanate) and is then reacted with a dialkyl malonate. A stoichiometric excess of dialkyl malonate is preferably employed, which means that the reaction mixture contains unreacted dialkyl malonate, which cannot participate in the crosslinking reaction and can therefore have an adverse effect on the film properties.

German Offenlegungsschrift 2,550,156 furthermore discloses a process for the preparation of polyisocyanate mixtures which contain "blocked" isocyanate groups and are readily soluble in paint solvents; in this process, 3-isocyanatomethyl-3,5,5-trimethylcyclohexyl isocyanate is partially reacted with a polyol before the reaction with a CH-active blocking agent. The "blocked" polyisocyanate described herein can in principle also be used in formulations for cathodic electrocoating if they are combined with basic synthetic resins which can be diluted with water after partial neutralization using acid. At low baking temperatures of, for example, 140° C., however, coatings are in most cases obtained whose hardness and solvent-resistance are inadequate. Even the concomitant use of aminoplastic resins, as described in German Offenlegungsschrift 2,723,117, brings no advantages; the catalysts—generally sulfonic acid—required for curing the amino plastic resins are probably neutralized by the basic synthetic resins and thus deactivated.

Austrian Patent No. 381,500 describes a process for the preparation of crosslinking components for synthetic resins containing groups which are capable of ester and/or amide formation with carboxylic acids, from a) diisocyanates, b) CH-active alkyl esters and c) polyamines and/or polyaminopolyols. These crosslinking components are distinguished by the fact that they react even at the relatively low temperature of 120°–140° C. with crosslinking with synthetic resins which are capable or ester or amide formations, the cleavage products produced being quite safe environmentally, above all when the transesterification- or transamidation-capable ester groups contain lower alcohols, in particular ethanol, as the alcohol component. Although these products have proven successful, they have disadvantages with regard to solubility in paint solvents which are frequently used, such as carboxylates, for example butyl acetate. If they are employed together with cationic synthetic resins, for example with amino polyether polyols, in aqueous systems for electrocoating, precipitation and deposition of the curing agents in the paint bath can also occur, even after a few days.

The object was therefore to find a curing component which is soluble in customary paint solvents, such as, for example, carboxylates, cures at the lowest possible temperature with binders containing hydroxyl and/or amino groups and liberates only small, only slightly environmentally polluting amounts of cleavage products on curing. In addition, this curing component should be usable, in particular, in systems for cathodic electrocoating in combination with cationic synthetic resins which can be diluted with water after at least partial protonation, without precipitation or deposition occurring in the paint bath.

It has now been found that products of the reaction of CH-active alkyl esters, polyisocyanates and polyoxyalkylene-polyamines satisfy these requirements.

The invention accordingly relates to a curing component (A) for synthetic resins (B) which are capable of amide and/or ester formation which is a product of the reaction of
(a) a polyisocyanate,
(b) a CH-active alkyl ester,
(c) a polyamine and
(d) where appropriate further NH- and/or OH-reactive compounds, wherein compound (b) has the formula $$X-CHR^2-CO_2R^1 \qquad (I)$$

in which X denotes $CO_2R^1$, $CN$, $CONH_2$, $CONHR^1$, $CON(R^1)_2$, $COR^1$ or $NO_2$ where $R^1$ is a linear or branched alkyl radical having 1 to 8 carbon atoms, and $R^2$ represents H or $R^1$, and the polyamine (c) is a polyoxyalkyleneamine.

The invention furthermore relates to a process for the preparation of this curing component (A), to curable mixtures which contain this curing component (A), and to the use of these curable mixtures in paint formulations, in particular in automobile repair paints.

The curing components (A) according to the invention react with polymers (B) carrying hydroxyl and/or amino groups from as low as 100° C. with transesterification and/or transamidation, the only cleavage product produced being the alcohol from the CH-active alkyl ester. They can be diluted with carboxylates, such as butyl acetate, to form a clear dilution and are particularly suitable as a component in water-based paints, in particular in compositions which can be deposited cathodically by the EC process. During the deposition process, no precipitation or deposition occurs in the paint bath. Surprisingly, films having greater thickness than under comparable conditions using a crosslinking agent without polyoxyalkyleneamines are also obtained after cathodic deposition.

For the preparation of the curing components (A) according to the invention, polyisocyanates, such as toluylene diisocyanate, hexamethylene diisocyanate and isophorone diisocyanate (IPDI), which are available on a large industrial scale, are preferably employed as component (a). In addition, compounds known from polyurethane chemistry, including corresponding prepolymers, if appropriate mixed with one another, are suitable for this purpose. These polyisocyanates contain at least two isocyanate groups, preferably 2 to 10 and in particular 2 to 4 isocyanate groups.

Examples of polyisocyanates of this type are aliphatic trimethylene, tetramethylene, pentamethylene, 1,2-propylene, 1,2-butylene, 2,3-butylene, 1,3-butylene, ethylidine and butylidine diisocyanate, 2,2,4-trimethylhexamethylene diisocyanate, 1,12-dodecane diisocyanate, dicycloalkylene diisocyanates, such as 1,3-cyclopentane diisocyanate, 1,4-cyclopentane diisocyanate and 1,2-, 1,3- and 1,4-cyclohexane diisocyanate; furthermore diisocyanates of dimeric acids, aromatic diisocyanates, such as 1,3-phenylene diisocyanate, 1,4-phenylene diisocyanate, 4,4-diphenyl diisocyanate, 1,5-naphthalene diisocyanate and 1,4-naphthalene diisocyanate, aliphaticaromatic diisocyanates, such as 4,4-diphenylenemethane diisocyanate, 4,4-toluidine diisocyanate and 1,4-xylylene diisocyanate, naphthalene-1,5-diisocyanate, ring-substituted aromatic isocyanates, such as dianisidine diisocyanate, 4,4-diphenyl ether diisocyanate and chlorodiphenylene diisocyanate, diphenylmethane 2,4- and/or 4,4-diisocyanate, 3,2- or 3,4-diisocyanato-4-methyldiphenylmethane, triisocyanate, such as triphenylmethane 4,4', 4"-triisocyanate, 1,3,5-benzene triisocyanate and 2,4,6-toluene triisocyanate, and tetraisocyanate, such as 4,4-diphenyldimethyldimethane 2,2,5,5-tetraisocyanate, or mixtures of these compounds.

Besides these simple polyisocyanates, those are also suitable which contain heteroatoms in the radical linking the isocyanate groups. Examples of these are polyisocyanates which contain carbodiimide groups, allophonate groups, isocyanurate groups, urethane groups, acylated urea groups and biuret groups.

In the formula (I) for the CH-active alkyl esters (b), the radicals X, $R^1$ and $R^2$ preferably represent:
$X = CO_2R^1$ or CN;
$R^1 =$ an alkyl radical having 1 to 6 carbon atoms;
$R^2 = H$.

Examples of compounds (b) of this type are dialkyl malonates of alcohols having 1 to 8, preferably 1 to 6, carbon atoms, such as dimethyl malonate, diethyl malonate, diisopropyl malonate and dioctyl malonate; the corresponding esters of cyanoacetic acid, such as, for example, ethyl cyanoacetate or hexyl cyanoacetate; the corresponding esters of acetoacetic acid, such as ethyl acetoacetate; diketones such as acetylacetone; malononitrile or malonic diamides or monoamides. Methyl, ethyl and butyl cyanoacetate and dimethyl and diethyl malonate are preferably employed. In some cases, it may also be advantageous for $R^1$ to be a branched alkyl radical, in particular 2-ethylhexyl, since the pitting tendency of a paint coat on baking can thus be counteracted. The methyl and ethyl esters accordingly give particularly low baking temperatures and low-molecular-weight cleavage products, which are, in addition, particularly safe. Mixtures of different CH-active alkyl esters are also possible.

The polyoxyalkyleneamines (c) contain at least one oxyalkylene group, preferably an oxypropylene group, and at least two amino groups, preferably primary amino groups. The molecular weight (Mw) is generally between 132 and 5,000, preferably 230 and 4,000 and in particular 400 and 2,000, while the equivalent weight, relative to the amino group, is usually 68 to 2,000, preferably 116 to 1,900, in particular 162 to 1,052. In this case, the primary amines are regarded as monofunctional.

Polyoxyalkylenepolyamines of this type are known and are described, for example, in U.S. Pat. Nos. 3,236,895, 3,654,370, 4,122,069 and 4,420,574, to which reference is hereby made.

Polyoxyalkylenepolyamines which are preferred according to the invention are, for example, those of the general formula (II)

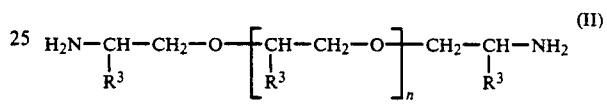

in which $R^3$ may be identical or different and denote H or an alkyl group having 1 to 6 carbon atoms, and n is an integer between 1 and 50, preferably between 5 and 35.

Further preferred polyoxyalkylenepolyamines are those of the general formula below

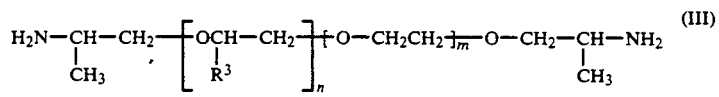

in which n+m denotes an integer between 1 and 50, preferably 5-35, and m and n are each an integer between 1 and 49, preferably 5 and 30.

Polyoxyalkylenepolyamines which may be mentioned here are also the triamines of the general formula below

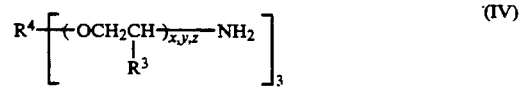

where $R^4$ is the radical of a trihydric alcohol, for example glycerol, trimethylolpropane, trimethylolethane, butane-1,2,4-triol or hexane-1,2,6-triol, $R^3$ has the abovementioned meaning and x, y and z have the same meaning as n.

In addition, it is also possible to employ derivatives of polyoxyalkyleneamines as component (c), for example those which are prepared by reacting the abovementioned polyoxyalkylenepolyamines with acrylonitrile with subsequent hydrogenation, and which can have, for example, the formula below:

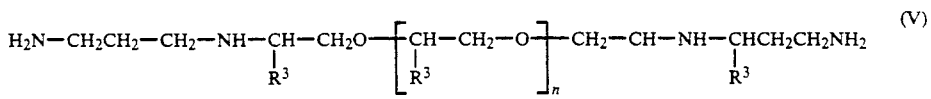

where n and $R^3$ have the above meaning. It is also possible to use mixtures of different polyoxyalkyleneamines. Suitable NH- and/or OH-reactive compounds (d) which can be used where appropriate are, for example, polyols, polyamines and/or (poly)amino(poly)ols.

Suitable polyols are all polyhydroxyl compounds, in particular diols or triols, which contain aliphatically or cycloaliphatically bound hydroxyl groups and which may also contain ether groups. Examples of these are: ethylene glycol, propylene 1,2-glycol and 1,3-glycol, butylene 1,4-glycol and 2,3-glycol, di-β-hydroxyethyl-butanediol, hexane-1,6-diol, octane-1,8-diol, neopentyl glycol, cyclohexane-1,6-diol, 1,4-bis-(hydroxymethyl)-cyclohexane, 2,2-bis(4-hydroxycyclohexyl)propane, 2,2-bis(4-(β-hydroxyethoxy)phenyl)propane, 2-methyl-1,3-propanediol, glycerol, trimethylolethane, trimethylolpropane, hexane-1,2,6-triol, butane-1,2,4-triol, tris(β-hydroxyethyl) isocyanurate, pentaerythritol and the hydroxyalkylation products thereof, furthermore diethylene glycol, triethylene glycol, tetraethylene glycol, polyethylene glycols, dipropylene glycol, tripropylene glycol, polypropylene glycols, dibutylene glycol, polybutylene glycols and xylylene glycol. It is also possible to employ polyesters which are obtained from or using lactones, for example ε-caprolactone, or hydroxycarboxylic acids, such as, for example, hydroxypivalic acid, ω-hydroxydecanoic acid, ω-hydroxycaproic acid and thioglycolic acid.

The polyamines are polyfunctional and contain at least two preferably 2 to 10, amino groups, of which at least two are preferably primary amino groups. Polyamines which are suitable for this purpose are preferably those of the general formula (VI)

$$H_2N-(R^5-NH)_n-R^5-NH_2 \qquad (VI)$$

in which $R^5$ represents a divalent, non-aromatic hydrocarbon radical having 2 to 18 carbon atoms, preferably a branched or linear alkylene radical having 2 to 10 carbon atoms, in particular having 2 to 6 carbon atoms, or a cycloalkylene radical having 5 to 12 carbon atoms, preferably 6 to 10 carbon atoms, or an aralkylene radical having 7 to 12 carbon atoms, preferably 8 to 10 carbon atoms, and n is 0 or an integer from 1 to 6, preferably 1 to 4.

Examples of these are: ethylenediamine, propylenediamine, 2-methylpentamethylenediamine, hexamethylenediamine, trimethylhexamethylenediamine, neopentyldiamine, octamethylenediamine, triacetonediamine, dioxadecanediamine and higher homologues, cycloaliphaticdiamines, such as 1,2-, 1,3- or 1,4-cyclohexanediamine; 4,4'-methylenebiscyclohexylamine, 4,4-isopropylenebiscyclohexylamine, isophoronediamine, tricyclododecenyldiamine, menthanediamine, 4,4'-diamino-3,3'-dimethyldicyclohexylmethane, 3-aminomethyl-1-(3-aminopropyl-1-methyl)-4-methylcyclohexane, m-xylylenediamine, N-methylethylenediamine, hydroxyethylaminoethylamine, hydroxyethylaminopropylamine, N-aminoethylpiperazine, 2-aminoethylpiperazine, N,N-dimethylethylenediamine, N,N-dimethylpropylenediamine, aliphatic polyamines, such as diethylenetriamine, triethylenetetramine, tetraethylenepentamine, pentaethylenehexamine, iminobispropylamine, methyliminobispropylamine, bis(hexamethylene)triamine and tetrapropylenepentamine.

Polyamines which can be used are also those containing additional amide groups, as obtained, for example, by condensation of di-primary amines with dicarboxylic acids, such as adipic acid, sepacic acid or dimeric fatty acid. Other amine adducts, for example imides, can also be employed for this purpose.

Of course, it is also possible to use mixtures of different polyamines.

Further suitable polyamines are described, for example, in German Patent Application P 3,726,497.4, to which reference is hereby made.

As (poly)amino(poly)ols which also contain at least one OH group besides primary and/or secondary amino groups, it is possible to use, for example, compounds of the general formula (VII):

$$A-(R^5NH)_n-R^5-B \qquad (VII)$$

in which A and B are $NH_2$ or OH, but where at least one of these two radicals represents OH, and $R^5$ and N have the meaning in the formula (VI).

Particularly suitable representatives of these are hydroxyethyldiethylenetriamine or bishydroxyethyldiethylenetriamine. In addition, monoethanolamine, diethanolamine, aminoethylethanolamine, N-(2-hydroxypropyl)ethylenediamine, mono-, di-(n or iso)propanolamine, ethylene glycol bispropylamine, neopentanolamine, methylethanolamine, 2-(2-aminoethoxy)ethanol, 3-aminopropyltrialkoxysilane (alkoxy=methoxy, ethoxy or tridecyloxy), 2-amino-2-hydroxymethyl-1,3-propanediol, and the like are suitable. It is likewise possible to use products of the reaction of polyamines or polyaminoalcohols, such as, for example, ethylenediamine, propylenediamine, hexamethylenediamine, trimethylhexamethylenediamine or m-xylylenediamine, with epoxides or 1,3-dioxolan-2-ones, such as, for example, propylene oxide, styrene oxide, hexene oxide or glycidyl ethers, such as phenyl glycidyl ether, ethylhexyl glycidyl ether, or butyl glycidyl ether, or with glycidyl esters, such as "Cardura E".

With respect to further (poly)amino(poly)ols, reference is made here to the abovementioned German Patent Application P 3,726,497.4.

The curing component (A) according to the invention is prepared by methods known per se, by reacting the compounds (a) to (c) and, where appropriate, (d). Preferably, the polyisocyanate (a) is initially reacted with the CH-active alkyl ester (b), and the remaining isocyanate groups are then reacted with the polyoxyalkyleneamines (c) and, if appropriate, with the polyols, polyamines and/or (poly)amino(poly)ols (d).

The reaction between the polyisocyanate and the CH-active alkyl ester is preferably carried out in the presence of solvents which contain no active hydrogen atoms and preferably under nitrogen and with exclusion of moisture. Suitable solvents are, for example: ethers, such as, for example, diethyl ether, tetrahydrofuran, dioxane, 1,2-dimethoxyethane or diethylene glycol dimethyl ether; ketones, such as acetone, methyl ethyl ketone or cyclohexanone; (cyclo)aliphatic and/or aromatic hydrocarbons, such as hexane, heptane, benzene, toluene, the various xylenes of mixtures of these hydrocarbons; halogenated hydrocarbons, such as methylene chloride, dimethylformamide and N-methylpyrrolidone.

This reaction is preferably carried out in the presence of basic compounds, such as alkoxides, in particular alkali metal alkoxides, such as lithium butoxide, sodium methoxide, potassium methoxide, sodium phenoxide or potassium phenoxide and the like, or metallic sodium, in amounts from about 0.1 to 5, preferably 0.1 to 0.5, % by weight, relative to the total weight of the reaction components.

The polyisocyanate and the CH-active alkyl ester are used in amounts such that at least $(n-1)$ moles of CH-active alkyl ester are present per n moles of isocyanate groups; an excess of 0.1 to 0.5 moles, i.e. $(n-1)+0.1-0.5$ moles of CH-active alkyl ester is preferably employed.

Specifically, the reaction can be carried out by initially introducing the polyisocyanate, if appropriate together with the solvent, and continuously adding the CH-acidic alkyl ester together with the catalyst, preferably at room temperature. As soon as the isocyanate content of the reaction mixture has fallen to a level such that, theoretically, all the CH-active alkyl ester has reacted with the polyisocyanate, the further reaction with the polyoxyalkyleneamine is carried out immediately.

The addition product of (a) and (b) and the polyoxyalkyleneamine (c) are expediently employed here in amounts such that one amino group is present per isocyanate group. If the polyoxyalkyleneamine is employed in a mixture with polyols or polyamines or (poly)amino(poly)ols, a total of one equivalent of amino and hydroxyl groups are generally present per isocyanate group.

The polyoxyalkyleneamine, if appropriate with the polyol, polyamine and/or (poly)amino(poly)ol, is initially introduced together with one of the abovementioned aprotic solvents, and the addition product is added rapidly at a rate such that the reaction temperature does not exceed 100° C., preferably 60° C. The reaction is allowed to continue until the isocyanate content has fallen below 0.5% by weight, preferably 0.2% by weight. In order to accelerate the reaction, it is also possible to add catalysts to the reaction mixture. Suitable catalysts are, for example, organometallic compounds, preferably tin(II) salts of carboxylic acids, such as tin(II) laurate, or dialkyltin salts of carboxylic acids, such as dibutyl tin dilaurate, tin octanoate etc.

The CH equivalent weight of the curing component (A) according to the invention is usually between 100 and 2,000, preferably 300 to 1,000, at a molecular weight (weight average $\overline{M}_w$, determined by means of gel chromatography; polystyrene standard) is usually between 500 and 50,000, preferably 2,000 and 10,000. The polyoxyalkyleneamine (c) and any NH-active compound (d) are bound in the curing component (A) via urea groups, which are produced by reaction with the isocyanate groups of the polyisocyanates (a) or the adduct thereof with (b). On statistical average, the curing component (A) contains at least two, preferably two to eight and in particular two to six, ester groups per molecule. The content of structural units (a) to (d) in the curing component (A) is generally 5 to 70, preferably 10 to 60% by weight of (a), 4 to 70, preferably 8 to 63, % by weight of (b), 3 to 90, preferably 6 to 60, % by weight of (c) and 0 to 80, preferably 3 to 40, % by weight of (d).

The invention furthermore relates to curable mixtures based on the curing component (A), a binder (B) which contains groups which are capable of ester and/or amide formation, where appropriate a diluent (C), and where appropriate additives (D).

The molecular weight (weight average $\overline{M}_w$) of (B), determined by means of gel chromatography (polystyrene standard), is usually in the range from about 300 to 50,000, preferably about 1,000 to 20,000. These binders (B) thus preferably have a resinous character. In special cases, the molecular weight may be 100,000 or more. The binders (B) may optionally also contain C=C double bonds, the C=C equivalent weight preferably being 500 to 1,500.

Suitable polymers for (B) are polymerization products, polycondensation products or polyaddition compounds. Examples of binders (B) are OH group-containing synthetic resins (polyols), such as polyether polyols, polyacetal polyols, polyester amide polyols, epoxy resin polyols or products of the reaction thereof with $CO_2$, phenolic resin polyols, polyurea polyols, polyurethane polyols, cellulose ester polyols, cellulose ether polyolys, partially hydrolyzed homopolymers and copolymers of vinyl esters, partially acetalated polyvinyl alcohols, polyester polyols or acrylate resin polyols. Furthermore suitable here are OH-containing phenolic, urea or melamin resins. The polyols of this type, which can also be employed in mixture, are described, for example, in German Offenlegungsschrift 3,124,784 and in European Offenlegungsschriften 123,880 and 189,728.

Polyester polyols, polyurethane polyols, polyether polyols and acrylate resin polyols are preferred.

The polyester polyols can be prepared, for example, by reacting polyhydric alcohols or epoxy compounds, for example fatty acid glycidyl esters, with polybasic, preferably dibasic, carboxylic acids or carboxylic anhydrides or carboxylates of lower alcohols. Suitable alcohols are, for example, ethylene glycol, propylene glycol, neopentyl glycol, glycerol, trimethylolpropane, pentaerythritol, diethylene glycol, polyethylene glycol or dipropylene glycol. Suitable carboxylic acids are, for example, succinic acid, succinic anhydride, adipic acid, dodecanedioic acid, azelaic acid, sebacic acid, various phthalic acids and the anhydrides thereof, dimethyl terephthalate, maleic acid, maleic anhydride, and dimeric and trimeric fatty acids. In addition, polyester polyols which are obtained by ring-opening polymerization of a cyclic ester, such as caprolactone, or butyrolactone, should also be mentioned here.

The urethane-modified polyols can be prepared by reacting an excess of the abovementioned polyester polyols with an organic polyiscyanate.

Examples of polyether polyols are those which are obtained by addition polymerization of alkylene oxides (for example ethylene oxide, propylene oxide or tetrahydrofuran) with low-molecular-weight polyols having 2 to 8 carbon atoms and a molecular weight of about 50–300 (for example ethylene glycol, diethylene glycol, propylene glycol, dipropylene glycol, glycerol, trimethylolpropane, 1,2,6-hexanetriol or pentaerythritol).

The acrylate resin polyols which are furthermore preferably employed are obtainable, for example, by copolymerization of hydroxyesters of olefinically unsaturated carboxylic acids, such as hydroxyalkyl acrylates, with other polymerizable olefinically unsaturated compounds, such as methacrylic acid and derivatives thereof, vinyl esters or vinyl aromatics.

For the formulation of cathodically depositable EC compositions, the curing component according to the invention is employed together with cationic resins which are capable of amide and/or ester formation with carboxylic acids.

Synthetic resins (B) which contain hydroxyl and amino groups are described, for example, in Journal of Coatings Technology, Vol. 54, No. 686, (1982), pp. 33 to 41 ("Polymer Compositions for Cationic Electrodepositable Coatings"), to which reference is made. Polymers made from $\alpha,\beta$-olefinically unsaturated monomers which contain hydroxyl and/or amino groups may be mentioned here. The hydroxyl and/or amino groups can be introduced using appropriate monomers in the copolymerization, for example by means of hydroxyl or amino esters of $\alpha,\beta$-olefinically unsaturated carboxylic acids, such as hydroxyalkyl (meth)acrylates or aminoalkyl (meth)acrylates, or by polymer-analogous reaction with diamines or polyamines, for example with N,N-dimethylaminopropylamine, with formation of amide, amino or urethane groups. A further group are the polyaminopolyamides obtainable from dimerized fatty acids and polyamines or the aminopolyether polyols, accessible, for example, by reacting epoxy resins with primary or secondary amines, which are particularly suitable. These are accessible, for example, by reacting primary or secondary amines with a polyglycidyl ether. In this reaction, sufficient epoxy groups should be present so that all the amino groups are converted into tertiary amino groups. The preferred polyglycidyl ethers are polyglycidyl ethers of bisphenol A and similar polyphenols. They can be prepared, for example, by etherifying a polyphenol using an epihalohydrin, such as epichlorohydrin, in the presence of alkali.

In place of the polyglycidyl ethers, the reaction products thereof with $CO_2$ can be employed. These products contain cyclic carbonate groups which can be reacted with primary amines to form urethanes. Depending on the polyglycidyl ether: $CO_2$ molar ratios, compounds are obtained in the reaction with $CO_2$ which no longer contain epoxy groups or which contain epoxy groups and cyclic carbonate groups.

Cyclic carbonate groups of this type can also be introduced into the polymer chain via appropriate monomers which contain these groups; in this respect, see German Patent Application P 3,644,372.7 and P 3,644,373. The reaction of polymers containing cyclic carbonate groups of this type with amines to form so-called aminourethanes is described, for example, in European Patent Applications 87,101,797.6 and 87,107,309.4 and in German Patent Application P 3,644,370.0.

The polyglycidyl ethers of the polyphenols or the reaction products thereof with $CO_2$ can be reacted as such with the amines, but it is frequently advantageous to react some of the reactive epoxy groups with a modified material in order to improve the film properties. Reaction of the epoxy groups with a polyol or a polycarboxylic acid is particularly preferred.

Polyols which can be employed are, for example, the above-described polyester polyols, polyether polyols or polyhydroxy acrylates.

The polycarboxylic acids are obtained by reacting the above-described polyols with an excess of polycarboxylic acids or preferably the anhydrides thereof.

They can likewise be obtained by esterifying polycarboxylic acids or anhydrides thereof using low-molecular-weight polyols, such as ethylene glycol, propylene glycol etc. In place of the low-molecular-weight polyols, it is also possible to employ low-molecular-weight polyether polyamines or polyamines, such as, for example, hexamethylenediamine.

The modification of the aminopolyether polyols using polyols or polycarboxylic acids is preferably carried out before reaction of the polyglycidyl ether or the reaction products thereof with $CO_2$ with the primary or secondary amines. However, it is also possible to select the ratio between the polyglycidyl ether used as a starting material and the amines so that an excess of epoxy groups is present. The epoxy groups can then be reacted with the polycarboxylic acids or polyols. It is furthermore possible to further modify the final product, which no longer contains epoxy groups, by reacting the hydroxyl groups with glycidyl ethers.

When used in electrocoatings, the number of basic groups in the binder (B) should be selected so that adequate water dilutability in an acidic medium is ensured.

The curing agent (A): binder (B) ratio in the nonself-curing systems (so-called 2-component paints), which are preferred according to the invention, depends on the crosslinking density required and on the number of ester groups in (A) and the number of hydroxyl and/or amino groups in (B). In general, this ratio is such that the number of ester groups in (A) is 0.2 to 2, preferably 0.5 to 2, per hydroxyl and/or primary or secondary amino group in the resin.

When used, as preferred, as a liquid paint formulation, the customary diluents (C) are present. Suitable as such are, for example, the known organic solvents, such as: halogenated hydrocarbons, ethers, such as diethyl ether, 1,2-dimethoxyethane, tetrahydrofuran or dioxane; ketones, such as, for example, acetone, methyl ethyl ketone, methyl isobutyl ketone, cyclohexanone and the like; alcohols, such as methanol, ethanol, 2-butoxyethanol, propanol, isopropanol, 2-methoxy-1-propanol, butanol and benzyl alcohol; esters, such as butyl acetate, ethyl glycol acetate and methoxypropyl acetate; (cyclo)aliphatic and/or aromatic hydrocarbons, such as hexane, heptane, cyclohexane, benzene, toluene, the various xylenes and aromatic solvents in the boiling range from about 150° to 180° C., such as ®Solvesso. The solvents can be employed here individually or in mixtures. Mixtures with water are also possible.

In the case of the preferred use of water as the diluent (C), for example in electrocoatings, the binders (B) contain cationic, anionic or non-ionogenic water-solubilizing groups. Examples of cationic groups are ammonium, phosphonium and sulfonium cations, and examples of anionic groups are ammonium salts of carboxylic acids. Suitable non-ionogenic groups are, for example, oxyethylates and oxypropylates.

Specifically for the production of cathodically depositable electrocoatings, the synthetic resins (B), expediently in organic solvents and preferably containing amino groups, and the curing agents (A) are mixed, and all or some of the amino groups are neutralized by reaction with a water-soluble acid, for example formic acid, acetic acid, lactic acid, phosphoric acid etc., before being diluted with water. The amount of acid depends in each individual case on the properties of the resin used and is generally carried out only to an extent such that the resin is solubilized or dispersed.

Aqueous formulations which have a particularly low content of volatile, organic solvents are obtained, as described, for example, in German Patent Application P 3,602,980.7, by removing the solvent present in the binders from the preparation process or the solution. This process step is preferably carried out under reduced pressure.

Customary additives which may be mentioned here in the context of (D) and may possibly be present in the curable mixture according to the invention are—depending on the respective purpose of use—the customary paint additives, such as pigments (iron oxides, lead oxides, lead silicates, titanium dioxide, barium sulfate, zinc oxide, zinc sulfide, phthalocyanine complexes etc.), pigment pastes, antioxidants, (UV) stabilizers, flow-control agents, thickeners, defoamers and/or wetting agents, reactive thinners, fillers (talc, mica, kaolin, chalk, quartz powder, asbestos powder, slate powder, various silicas, silicates etc.), additional curing agents and additional curable compounds, catalysts and the like. Where appropriate, addition of these additives to the mixture may be delayed until immediately before processing.

Suitable catalysts for accelerating the curing are, for example, salts or complexes of metals, such as, for example, lead, zinc, iron, tin, manganese and bismuth.

Preferred metallic catalysts here are dialkyltin dicarboxylates, such as dibutyltin dilaurate and dibutyltin diacetate, furthermore dibutyltin oxide, lead octanoate and lead acetylacetonate. The amount of catalyst is generally 0.1 to 2.0% by weight, preferably 0.5 to 2% by weight (relative to the sum of (A) and (B)). It can be varied depending on the reactivity of the compounds (A) and (B), the type of solvents which may be present, the activity of the catalyst and the intended process control. The metallic catalysts can be mixed directly with the starting materials or separately added to the paint, dispersed in a suitable binder.

If the curable mixture is a dispersion, the content of (A) and (B) is generally 10 to 80% by weight, advantageously 10 to 40% by weight.

In order to produce the curable mixtures according to the invention, components (A) and (B) and, where appropriate, additionally (C) and (D), are mixed. In the case of low-viscosity components, this can take place without solvents, with warming to elevated temperatures if necessary. Products of higher viscosity are dissolved or dispersed in the diluents mentioned before mixing.

The curing of the mixtures according to the invention proceeds very rapidly and gives coatings of good hardness and good solvent resistance at temperatures from 120° to 140° C. and baking times of only 20 to 40 minutes.

Due to their favorable properties, the mixtures according to the invention can be used in a wide variety of industrial areas, for example for the production of moldings (casting resins), for tool manufacture or for the production of coatings and/or intermediate coatings on a wide variety of substrates, for example on substrates of an organic or inorganic nature, such as wood, wood fibers (wood sealing), textiles of natural or synthetic origin, plastics, glass, ceramics, building materials, such as concrete, fiberboard, and artificial stone, but in particular on metal, such as iron, aluminum, copper and the like. The metal surfaces, in particular in the case of iron, may, if necessary, be primed by zinc-coating, phosphate-coating or zinc/phosphate-coating etc. In addition, the mixtures according to the invention can be employed as components of adhesives, cements, laminating resins, synthetic resin cements and, in particular, as components of paints and coatings for coating industrial objects, household appliances, furniture and in civil engineering, such as, for example, refrigerators, washing machines, electrical appliances, windows and doors. Application can take place, for example, by brushing, spraying, dipping, electrostable coating and the like. In the case of electroconductive substrates, electrolytic deposition is preferred.

A preferred field of application for the mixtures according to the invention is paint formulations, in particular electrocoatings.

The invention is described in greater detail by the examples below.

EXAMPLE 1

200 g of dibutyl malonate were added continuously at room temperature over the course of 8 hours to a mixture of 130 g of hexamethylene diisocyanate, 220 g of butyl acetate and 0.6 g of sodium methylate. The reaction was allowed to continue at room temperature until the isocyanate content was 4.75%. The reaction mixture was then introduced into a mixture of 100.8 g of a polyoxypropylenetriamine having an equivalent weight of 81 g/mol (®Jeffamin T 403) and 0.4 g of DBTL in 67.6 g of butyl acetate. The mixture was subsequently warmed to 80° C. until the isocyanate content had fallen to below 0.1%. After filtration, a clear pale yellow resin solution having a solids content of 50% and viscosity of 200 mPas was obtained.

COMPARATIVE EXAMPLE A 200 g of dibutyl malonate were added continuously at room temperature over the course of 8 hours to a mixture of 130 g of hexamethylene diisocyanate, 220 g of butyl acetate and 0.6 g of sodium methylate. The reaction was allowed to continue at room temperature until the isocyanate content was 4.75%. The reaction mixture was then introduced into a mixture of 21.4 g of diethylenetriamine and 0.4 g of DBTL in 14.9 g of butyl acetate and warmed at 80° C. until the isocyanate content was below 0.1%. A turbid resin solution was obtained, from which some of the reaction product had precipitated. Even after filtration, it was not possible to produce a clear resin solution.

EXAMPLE 2 a) Preparation of the Curing Agent (A)

238 g of dimethyl malonate were added continuously at room temperature over the course of 1.5 hours to a mixture of 315 g of trimethylhexane diisocyanate, 369 g of diethylene glycol dimethyl ether and 0.75 g of sodium methylate. The reaction was allowed to continue at room temperature until the isocyanate content was 5.5%. The reaction mixture was then rapidly introduced into a mixture of 242.4 g of a polyoxypropylenediamine having an equivalent weight of 101 g/mol (®Jeffamin D 400) and 162 g of diethylene glycol dimethyl ether at a rate such that the reaction temperature did not exceed 30° C. The mixture was subsequently warmed at 60° C. until the isocyanate content was below 0.1%.

b) Preparation of a Cationic Binder (B)

An aminopolyether polyol was prepared by known methods (for example as described in German Offenlegungsschrift 3,417,441) from
52.6% of a bisphenol A epoxy resin having an epoxide equivalent weight of 480,
10.3% of an epoxide/amine adduct prepared from 11.8% of diethylenetriamine, 66.4% of 2-ethylhexyl glycidyl ether and 21.8% of a bisphenol A epoxy resin and having an equivalent weight of 183,
22.6% of a bisphenol A epoxy resin having an epoxide equivalent weight of 183,
3.8% of 2-ethylhexylamine,
7.5% of diethanolamine and
3.2% of diethylaminopropylamine.

The product was dissolved in 1-methoxy-2-propanol to form a 65% strength solution and had an amine number of 72 mg of KOH/g of solution.

c) Electrocoating and Testing 36 g of the binder and 20 g of the curing agent were diluted with 5 g of 5N formic acid and 272 g of demineralized water. The paint bath was stirred for 24 hours and then had the following characteristic data:
 solids content: 10% by weight
 pH: 5
 bath conductivity: 1,800 $\mu S$ cm$^{-1}$
 MEQ value: 17.

On phosphate-coated steel sheeting connected as the cathode, a smooth coating having a thickness of 14 $\mu m$ and a solvent resistance of more than 500 double strokes with methyl isobutyl ketone is obtained after deposition (bath temperature of 25° C.; 1 minute; 150 V) and curing (30 minutes, 120° C.).

EXAMPLE 3 a) Preparation of the Curing Agent (A)

238 g of dimethyl malonate were added continuously at room temperature over the course of 1.5 hours to a mixture of 315 g of trimethylhexane diisocyanate, 369 g of diethylene glycol dimethyl ether and 0.78 g of sodium methylate. The reaction was allowed to continue at room temperature until the isocyanate content was 5.5%. The reaction mixture was then introduced rapidly into a mixture of 194.4 g of Jeffamin T 403 and 130 g of diethylene glycol dimethyl ether at a rate such that the reaction temperature did not exceed 30° C. The mixture was subsequently warmed at 60° C. until the isocyanate content was below 0.1%.

b) Electrocoating and Testing 36 g of the binder from Example 2 and 20 g of the curing agent as in a) were diluted with 5 g of 5N formic acid and 27.2 g of demineralized water. The paint bath was stirred for 24 hours and then had the following characteristic data:
 solids content: 10% by weight
 pH: 6
 bath conductivity: 1,720 $\mu S$ cm$^{-1}$
 MEQ value: 18.

On phosphate-coated steel sheeting connected as the cathode, a smooth coating having a thickness of 16 $\mu m$ and a solvent resistance of more than 500 double strokes with methyl isobutyl ketone was obtained after deposition (bath temperature 25° C.; 1 minute; 150 V) and curing (30 minutes, 120° C.).

EXAMPLE 4 a) Preparation of the Curing Agents (A)

400 g of dibutyl malonate were added continuously at room temperature over the course of 8 hours to a mixture of 342 g of 3-isocyanatomethyl-3,5,5-trimethylcyclohexyl isocyanate, 495 g of diethylene glycol dimethyl ether and 1.2 g of sodium methylate. The reaction was allowed to continue at room temperature until the isocyanate content was 4.2%. The reaction mixture was then introduced rapidly into a mixture of 97.8 g of Jeffamin T 403 and 347 g of diethylene glycol dimethyl ether at a rate such that the reaction temperature did not exceed 30° C. The mixture was subsequently warmed at 60° C. until the isocyanate content was below 0.1%.

b) Electrocoating and Testing 36 g of the binder from Example 2 and 20 g of the curing agent were diluted with 5 g of 5N formic acid and 272 g of demineralized water. The paint bath was stirred for 24 hours and then had the following characteristic data:
 solids content: 10% by weight
 pH: 5
 bath conductivity: 1,150 $\mu S$ cm$^{-1}$
 MEQ value: 51.

On phosphate-coated steel sheeting connected as the cathode, a smooth coating having a thickness of 23 $\mu m$ and a solvent resistance of more than 500 double strokes with methyl isobutyl ketone was obtained after deposition (bath temperature 28° C.; 1 minute; 250 V) and curing (30 minutes, 120° C.).

COMPARATIVE EXAMPLE B

In place of Jeffamin T 403 of Example 4, 42 g of diethylenetriamine were employed; using the same procedure, an aqueous paint bath was produced. After only 24 hours, a precipitate had deposited in the bath and, although it could be stirred up, re-precipitated after a short time.

EXAMPLE 5

288 g of diethyl malonate were added at room temperature over the course of 4 hours to a mixture of 333 g of 3-isocyanatomethyl-3,5,5-trimethylcyclohexyl isocyanate, 526 g of butyl acetate and 0.78 g of sodium methylate. The reaction was then allowed to continue at room temperature until the isocyanate content was 4.4%. The reaction mixture was then introduced rapidly to a mixture of 600 g of a polyoxypropylene glycol diamine having an equivalent weight of 250 g/mol (Jeffamin ED 900) and 289 g of butyl acetate at a rate such that the reaction temperature did not exceed 30° C. The reaction was allowed to continue until the isocyanate content was below 0.1%. A clear, pale yellow solution having a solids content of 60% and a viscosity of 450 mPas was obtained.

EXAMPLE 6

In place of Jeffamin ED 900 of Example 5, 242 g of a polyoxypropylene glycol diamine having an equivalent weight of 101 g/mol (Jeffamin D 400) in 51 g of butyl acetate were employed. A clear, pale yellow solution having a solids content of 60% and a viscosity of 1,900 mPas was obtained.

EXAMPLE 7 a) Preparation of the Curing Agent (A)

238 g of dimethyl malonate were added continuously at room temperature over the course of 3 hours to a mixture of 315 g of trimethylhexane diisocyanate, 0.78 g of sodium methylate and 369 g of butyl acetate. The reaction was allowed to continue at room temperature until the isocyanate content was 5.5%. The reaction mixture was then introduced rapidly into a mixture of 179 g of a polyoxypropylene glycol diamine having an equivalent weight of 160 g/mol (Jeffamin ED 600) and 119 g of butyl acetate at a rate such that a reaction temperature did not exceed 30° C. The reaction was allowed to continue until the isocyanate content was below 0.1%. A clear, pale yellow solution having a solids content of 60% and a viscosity of 350 mPas was obtained.

b) Preparation of a Binder (B)

82.14 P of a 50% strength solution of a glycidyl group-containing acrylic resin, prepared from methyl methacrylate, styrene, 2-ethylhexyl acrylate and glycidyl methacrylate (epoxide equivalent weight of the solution: 560) in 15 P of methoxypropyl acetate and 26 P of butyl acetate were treated with 0.5 P of hydroquinone monomethyl ether, 8.4 P of acrylic acid, 8.95 P of butyl acetate and 0.01 P of tetraethylammonium bromide.

The mixture was allowed to react at 100° C. until an acid number <1 had been reached. The pale yellow solution had a solids content of 50% and a OH equivalent weight of 860 g/mol and a C=C equivalent weight of 860.

c) Production of the Coatings 35.6 P of curing agent and 50 P of binder were mixed, and 35 P of a 20% strength solution of tetrabutylammonium fluoride in butyl acetate/ethanol were added. A viscosity of 20 in Pas, flow time 4, DIN 53211/20° C. was established using butyl acetate, and the coating material was applied to glass plates in a wet-film thickness of 100 μm by means of an application doctor, and dried at room temperature or at 60° C. After one day, the coatings exhibited a pendulum hardness of 70 or 95 s respectively and a xylene resistance of more than 1 hour. The gelling time of the coating material was about 20 hours.

If, for comparison purposes, the curing agent according to the invention was replaced by a product of the reaction of diethyl malonate and a biuret polyisocyanate as in Example 2 of German Offenlegungsschrift 2,342,603, the gelling time was more than 24 hours, even using twice the catalyst concentration. The pendulum hardness of the films dried at room temperature was only 36 s after one day, and xylene resistance was not achieved.

We claim:

1. A curing component (A) for synthetic resins (B), said resin (B) containing at least one member of the group consisting of hydroxy and amino groups, which is a product obtained by reacting in a first step
   (a) a polyisocyanate, and
   (b) a CH-active alkyl ester, wherein the component (b) has the formula

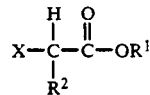

in which X is a member of the group consisting of —$CO_2$— $R^1$ —CN, —$CONH_2$, —$CONHR^1$, —$CON(R^1)_2$, —$COR^1$ and —$NO_2$, wherein $R^1$ is a linear or branched alkyl of 1 to 8 carbon atoms, and $R^2$ represents H or $R^1$, in the presence of a solvent free of active hydrogen atoms wherein the polyisocyanate (a) and the CH-active alkyl ester (b) are used in amounts such that at least (n−1) moles of CH-active alkyl ester are present per n moles of isocyanate groups, n is 1 to 50, and subsequently reacting in a second step the first step reaction product with
   (c) a polyoxyalkyleneamine.

2. A curing component as claimed in claim 1 wherein the polyisocyanate (a) is toluylene diisocyanate, hexamethylene diisocyanate or isophorone diisocyanate.

3. A curing component as claimed in claim 1 wherein, in the formula (I), X is $CO_2R^1$ $R^1$ is alkyl of 1 to 6 carbon atoms or —CN, and $R^2$ is hydrogen.

4. A curing component as claimed in claim 1, wherein compound (b) is a dialkyl malonate or an alkyl cyanoacetate.

5. A curing component as claimed in claim 1, wherein the polyoxyalkyleneamine (c) has the formula (III)

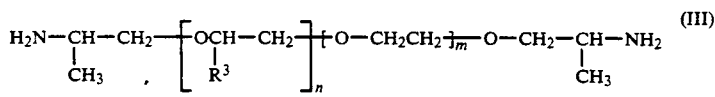

in which n+m denotes an integer between 1 and 50.

6. A curing component as claimed in claim 1, wherein the polyoxyalkyleneamine (c) has the formula (IV)

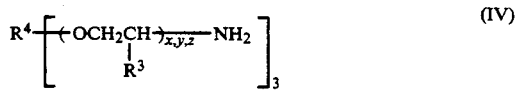

in which $R^4$ denotes the radical of a trihydric alcohol, $R^3$ is hydrogen or alkyl of 1 to 6 carbon atoms, and x, y and z are 1 to 50.

7. A process for the preparation of a curing component (A) as claimed in claim 1 which comprises reacting (a) a polyisocyanate, (b) a CH-active alkyl ester of the formula I as in claim 1 and (c) a polyoxyalkyleneamine.

8. The process as claimed in claim 7, wherein the reaction is carried out in the presence of catalysts.

9. The process of claim 7 wherein also reacted is d) at least one member of the group consisting of —NH— and —OH reactive compounds.

10. A curing component of claim 1 wherein the reaction product also contains d) at least one member of the group consisting of —NH— and —OH reactive compounds.

11. In a method of painting an object with a paint formulation, the improvement comprising using a curing component of claim 1 in the paint formulation.

12. The method of claim 11 wherein the paint formulation is an electrocoating formulation.

13. A curable mixture based on a curing component (A), a synthetic resin (B) containing at least one member of the group consisting of hydroxy and amino groups and having a mean molecular weight ($M_w$) of about 1,000 to about 100,000, a diluent (C), and additives (D) wherein the curing component present is a product obtained by reacting in a first step (a) a polyisocyanate, and (b) a CH-active alkyl ester, wherein the compound (b) has the formula

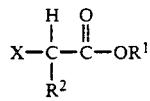

in which X is a member of the group consisting of —$CO_2$—$R^1$, —CN, —$CONH_2$, —$CONHR^1$, —$CON(R^1)_2$, —$COR^1$ and —$NO_2$, wherein $R^1$ is a linear or branched alkyl of 1 to 8 carbon atoms, and $R^2$ represents H or $R^1$ and subsequently reacting in a second step the first step reaction product with (c) a polyoxyalkyleneamine.

14. A curable mixture as claimed in claim 13, wherein (B) has a mean molecular weight ($\overline{M}_w$) of about 1,000 to about 20,000 and contains hydroxyl groups and/or amino groups.

* * * * *

UNITED STATES PATENT AND TRADEMARK OFFICE
CERTIFICATE OF CORRECTION

PATENT NO. : 5,126,424
DATED : June 30, 1992
INVENTOR(S) : GERHARD BRINDOPKE and HELMUT PLUM It is certified that error appears in the above-identified patent and that said Letters Patent is hereby corrected as shown below:

Col. 16, Claim 5  Formula III,

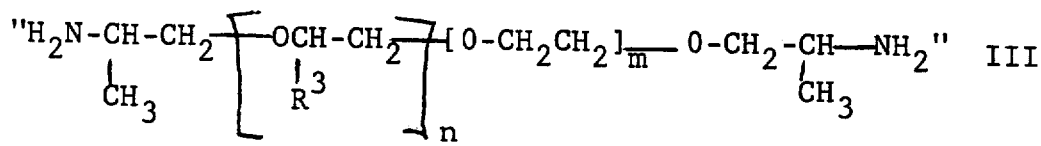

should be

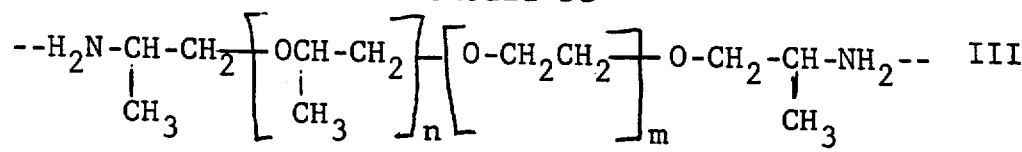

Col. 4  Formula III same as above

Signed and Sealed this

Twenty-first Day of September, 1993

Attest:

BRUCE LEHMAN

Attesting Officer  Commissioner of Patents and Trademarks